Patented May 2, 1933

1,907,316

UNITED STATES PATENT OFFICE

FREDERIC C. BOWMAN, OF LOS ANGELES, CALIFORNIA, ASSIGNOR TO A. R. MAAS CHEMICAL COMPANY, OF LOS ANGELES, CALIFORNIA, A CORPORATION OF CALIFORNIA

COMPOSITION FOR USE AS A WASHING POWDER, ETC.

No Drawing.   Application filed February 19, 1930. Serial No. 429,821.

This invention relates to an improved composition of matter for use as a detergent, water softener or boiler compound, and the main object of the invention is to provide a composition which will avoid certain objectionable features of compositions now in use for such purposes.

Trisodium phosphate is in general use as a detergent and as an ingredient in detergent, water softening and water treating compositions, and while it has recognized advantageous properties in connection with such uses, it is open to the objection that it is injuriously affected by certain conditions of heat and humidity liable to prevail under the conditions of use or of storage. The composition constituting my invention obviates these objectionable factors while presenting the properties required for an effective detergent, water softener or boiler compound.

My invention is based primarily on the discovery that the chemical compound, sodium borophosphate, $Na_4PBO_6 \cdot 18H_2O$ has certain advantageous properties as hereinafter set forth, adapting it for use as a detergent, water softener, or boiler compound, or as an ingredient of a composition for such purposes.

Sodium borophosphate, $Na_4PBO_6 \cdot 18H_2O$, is a known chemical compound, crystallizing in small cubes, and octahedra and melting at 69° C. In solution its properties are the same as those of an equimolecular mixture of trisodium phosphate and sodium metaborate. In solid form, however, it possesses valuable properties not found in a mechanical mixture of trisodium phosphate with sodium metaborate. Whereas, trisodium phosphate melts at about 42° C., sodium borophosphate melts at 69° C. The former temperature is reached in summer weather in most parts of the United States, but the latter, never. Hence arises caking trouble due to high temperature. Commercial trisodium phosphate is a solid solution of 2%–3% NaOH in 96%–100% $Na_3PO_4 \cdot 12H_2O$. It effloresces so readily that all commercial material shows less than 12 waters of crystallization.

Furthermore, sodium borophosphate is at ordinary temperature neither deliquescent nor efflorescent but very stable, while trisodium phosphate effloresces readily at ordinary temperatures and humidities. Such efflorescence causes trisodium phosphate to cake. A mixture of trisodium phosphate and sodium metaborate or borax would show the same tendencies to melt and to effloresce, and therefore to cake, that are exhibited by pure trisodium phosphate, though not perhaps to as great a degree, as the borate would separate the grains of trisodium phosphate and thus prevent them from caking. According to my invention a detergent in which the phosphate and borate are chemically combined is definitely superior to a mechanical mixture of the same analysis because caking is avoided.

My invention comprises a washing powder, cleaner, detergent, water softener, or boiler compound, especially free from caking and consisting of sodium borophosphate in crystalline granular dry condition together with trisodium phosphate. I have found by trial that this composition is an excellent washing powder, washing clothes and dishes without use of soap or formation of suds, which are undesirable and troublesome in mechanical washers.

I have also found that sodium borophosphate added in small amount to trisodium phosphate makes it free flowing and less subject to caking, except in very hot weather. I have found that as little as one per cent of sodium borophosphate added to trisodium phosphate exerts enough effect in preventing caking to make the product more marketable.

The term "sodium borophosphate" as herein used is intended to define the combination of sodium metaborate and trisodium phosphate represented by the formula $Na_4PBO_6 \cdot 18H_2O$.

Sodium borophosphate may be made by mixing strong solutions of trisodium phosphate and sodium metaborate and cooling, separating and drying in the usual manner.

I claim:

1. A detergent, cleaner, washing compound, water softener or boiler compound, containing trisodium phosphate, together with sodium borophosphate in dry crystalline granular condition.

2. A detergent, cleaner, washing compound, water softener or boiler compound consisting of a mixture of trisodium phosphate and sodium borophosphate, with or without other ingredients.

In testimony whereof I have hereunto subscribed my name this 4th day of February, 1930.

FREDERIC C. BOWMAN.